(12) United States Patent
Wang et al.

(10) Patent No.: US 11,372,658 B2
(45) Date of Patent: Jun. 28, 2022

(54) CROSS-DEVICE MULIT-MONITOR SETUP FOR REMOTE DESKTOPS VIA IMAGE SCANNING

(71) Applicant: VMware, Inc., Palo Alto, CA (US)

(72) Inventors: Dong Wang, Beijing (CN); Haiou Jiang, Palo Alto, CA (US); Yunfei San, Beijing (CN); Peng Guo, Beijing (CN); Kun Shi, Beijing (CN)

(73) Assignee: VMware, Inc., Palo Alto, CA (US)

( * ) Notice: Subject to any disclaimer, the term of this patent is extended or adjusted under 35 U.S.C. 154(b) by 533 days.

(21) Appl. No.: 15/879,408

(22) Filed: Jan. 24, 2018

(65) Prior Publication Data

US 2019/0227820 A1 Jul. 25, 2019

(51) Int. Cl.
G06F 9/451 (2018.01)
G06F 3/0481 (2022.01)

(52) U.S. Cl.
CPC ............ *G06F 9/452* (2018.02); *G06F 3/0481* (2013.01); *G06F 2203/0383* (2013.01)

(58) Field of Classification Search
CPC . G06F 9/452; G06F 3/0481; G06F 2203/0383
See application file for complete search history.

(56) References Cited

U.S. PATENT DOCUMENTS

| 6,801,576 B1 | 10/2004 | Haldeman |
| 2012/0326851 A1 | 12/2012 | Xu |
| 2013/0221083 A1 | 8/2013 | Doss |
| 2013/0225080 A1 | 8/2013 | Doss |
| 2013/0225081 A1 | 8/2013 | Doss |
| 2013/0262687 A1 | 10/2013 | Avery |
| 2014/0181256 A1 | 6/2014 | Trifa |
| 2015/0244812 A1 | 8/2015 | Brunson |
| 2016/0057135 A1* | 2/2016 | Jiang ................... H04L 63/0853 713/172 |
| 2016/0378782 A1 | 12/2016 | Jiang |
| 2017/0104797 A1 | 4/2017 | Venkatesh |

(Continued)

OTHER PUBLICATIONS

Dong Wang, et al. "Redirecting Multimedia Captured on a Mobile Device to a Virtual Desktop Using Image Scanning", U.S. Appl. No. 15/653,692, filed Jul. 19, 2017.

(Continued)

*Primary Examiner* — Angie Badawi (57) ABSTRACT

Techniques are described for extending virtual desktops across different devices. The virtual desktop client sets up a web server on a primary device. A QR code encoded with information identifying the web server is displayed on the primary device and is scanned by a secondary device. A web browser is launched on the secondary device and the web browser connects to the web server on the primary device. The virtual desktop is reconfigured to produce its GUI on two monitors, one for the primary device and one for the secondary device. The GUI data for the second monitor is streamed by the virtual desktop client to the secondary device over the HTTPS connection, to be displayed on the secondary device. GUI data for the first monitor is displayed on the primary device. Inputs are streamed from the secondary device to the primary device and are forwarded to the virtual desktop.

20 Claims, 6 Drawing Sheets

(56) References Cited

U.S. PATENT DOCUMENTS

2017/0300189 A1* 10/2017 Pendergast ............. G11B 27/34
2017/0351537 A1* 12/2017 AbiEzzi ................... G06F 3/14
2019/0026121 A1    1/2019 Dong
2019/0026122 A1    1/2019 Dong

OTHER PUBLICATIONS

Dong Wang, et al. "Redirecting Multimedia Output of a Virtual Desktop to a Mobile Device Using Image Scanning", U.S. Appl. No. 15/653,705, filed Jul. 19, 2017.

* cited by examiner

CROSS-DEVICE MULIT-MONITOR SETUP FOR REMOTE DESKTOPS VIA IMAGE SCANNING

TECHNICAL FIELD

The present disclosure generally relates to virtual desktop infrastructure and more specifically to techniques for accessing a virtual desktop session on a multi monitor setup across different devices by using image scanning and by implementing a web server.

BACKGROUND

Virtual desktops provided as part of a virtual desktop infrastructure (VDI) or desktop-as-a-service (DAAS) offerings are becoming more commonplace in today's enterprise work environments. The security of having a remotely stored desktop, ability to access the desktop from any location and on any device, centralized desktop management, efficient use of hardware resources, as well as numerous other benefits made possible by VDI/DAAS are a large benefit for many organizations.

In a conventional VDI or DAAS environment, each user in an enterprise is provisioned a virtual desktop and is allowed to access his or her virtual desktop over a remote network connection, such as a WAN connection. The virtual desktops are typically hosted on servers that reside in a data center of the enterprise (or a third-party service provider), and each host server may execute multiple virtual desktops. Users can utilize a client device to remotely log into their individual virtual desktop and all of the application execution takes place on the remote host server that is linked to the local client device over a network using a remote display protocol, such as remote desktop protocol (RDP), PC-over-IP protocol (PCoIP), VMware Blast, virtual network computing (VNC) protocol, or the like. Using the remote desktop protocol, the user can interact with applications of the virtual desktop, which are running on the remote host server, with only the display, keyboard, and mouse information communicated with the local client device. A common implementation of this approach is to host multiple desktop operating system instances on separate virtual machines deployed on a server hardware platform running a hypervisor.

With the proliferation of mobile devices in work and life, more and more individuals are using mobile devices to access their remote virtual desktops. An increasing number of users bring their own smart phones and tablets to work and access their remote desktop on these devices. People enjoy the mobility allowed by mobile devices. A person can bring his or her smart phone anywhere and use it anytime. This allows users to take advantage of the small segments of available time. For example, a user can use her smartphone to work while going home on the subway. While enjoying the advantages of mobility, users are experiencing the pain points of mobile devices as well, such as small screens and limited input capabilities. For example, it can be difficult to input large numbers of characters on a mobile device. When a user who is accessing her virtual desktop on a mobile device desires the larger screen or better input capabilities of another device such as a laptop or desktop computer, she would generally need to log into her remote desktop from the other device, which can be disruptive, inconvenient, or in some cases impossible. For VDI users with mobile devices, such pain points can be the main barrier to making mobile devices the primary work tool.

DETAILED DESCRIPTION

Systems and methods in accordance with various embodiments of the present disclosure overcome at least some of the above-mentioned shortcomings by providing more seamless and efficient ways for a user of a virtual desktop to extend the virtual desktop session with devices that can be used as additional monitors and/or input devices for the session. The virtual desktop can be configured for multi-monitor mode and image scanning can be used in combination with a web server such that the users wishing to extend their sesion with additional monitor devices do not need to install a virtual desktop client application on, or set up an account with, the virtual desktop system for the other devices. As will be described in more detail, a cross-device extended virtual desktop is enabled by configuring the virtual desktop to produce its graphical user interface (GUI) on multiple monitors and displaying the data of different monitors on different user devices, while also allowing the different devices to convey inputs to the virtual desktop.

The process can begin by a user of a virtual desktop logging into the virtual desktop session through a virtual desktop client application running on the user's primary computing device, which may be a mobile computing device such as a smartphone but could be any other suitable computing device. Once logged in, the GUI information of the virtual desktop session begins to be streamed to the primary computing device to be displayed on a display screen of the primary computing device by the virtual desktop client. At this point, the virtual desktop session is configured to produce the GUI on a single monitor for the display screen of the primary computing device.

Once logged into the virtual desktop session, the user may provide input indicating that the virtual desktop session is to be extended with a secondary computing device, which may be a laptop or desktop computer, or any other type of computing device that can be utilized as an additional monitor for the virtual desktop session. In response to detecting the input indicating that the virtual desktop session is to be extended, the virtual desktop client application displays an image, such as a Quick Response (QR) code inside the virtual desktop graphical user interface (GUI). In one embodiment, the QR code is encoded with information (e.g., IP address) identifying a web server that is executing on the primary computing device of the virtual desktop user. The web server is set up by the virtual desktop client application, for example, at a time when the virtual desktop client application is installed and/or launched on the user's primary computing device.

Once the QR code (or similar encoded image) is displayed on the virtual desktop client, the user may scan the QR code with the secondary computing device, for example by utilizing a digital camera of the secondary computing device. The secondary computing device may be a device providing better or more convenient features for working. Such features may be a larger monitor, better audio, and/or better inputting capabilities (mouse, touch pad, keyboard, etc.) than the primary computing device. For example, the secondary computing device may be a laptop, desktop computer, or a tablet computer, while the primary computing device may be a smartphone. When the QR code is scanned, a web browser is launched on the secondary computing device and establishes an HTTPS connection with the web server operating on the primary computing device of the desktop session user. The web browser executes a web application provided by the web server, for extending the virtual desktop session with additional monitor and/or input devices.

Once the connection between the web browser on the secondary computing device and the web server on the primary computing device is established, the web application on the secondary computing device sends screen information to the primary computing device, such as the screen height and width in pixels, so that the virtual desktop GUI can be reconfigured to include a second monitor for the secondary computing device. The virtual desktop client application on the primary client device then communicates to the virtual desktop that it has two screens and provides the information for each screen. In turn, the virtual desktop is reconfigured to produce its GUI on two monitors, one monitor corresponding to the display screen of the primary computing device and one monitor corresponding to the display screen of the secondary computing device.

After the GUI of the virtual desktop is reconfigured for two monitors, the pixel data of each of the two monitors is streamed to the virtual desktop client. The pixel data of the first monitor of the GUI is displayed on the display screen of the primary computing device by the virtual desktop client. The pixel data of the second monitor of the GUI is streamed from the virtual desktop client to the mobile device over the HTTPS connection and is displayed on the display screen of the secondary computing device by the web application in the web browser.

In addition, any input data, such as mouse, keyboard, and touch input events captured on the secondary computing device can be streamed to the virtual desktop client operating on the primary computing device via the connection between the web server on the primary computing device and the web application on the secondary computing device. The virtual desktop client can in turn transmit the input data to the virtual desktop on the remote server, to be provided to the guest operating system of the virtual desktop. Any GUI updates caused by the input on either of the two monitors are transmitted from the virtual desktop on the server to the virtual desktop client operating on the primary computing device and the GUI updates of the second monitor are forwarded to the secondary device's web browser in order to continue the session.

Thus, the embodiments described herein provide a Web based solution for virtual desktop users, with which a mobile device user (or other type of device) could connect any suitable device capable of internet connectivity to his mobile device and make it function as an external display for the virtual desktop session as well as take advantage of the input capabilities of the added device. Since it is a Web based solution, the user will not need to install any extra software to the device that he/she wants to use as an external display. The user only needs to use the added device's camera and image scanning application to scan the QR code (or another type of image) displayed on the virtual desktop client application (installed on the mobile device). Then, a browser is opened on the added device and the added device is connected to the user's mobile device.

In an example use case of the solution, a user is using a smartphone with an installed virtual desktop client to access a remote desktop. The user is working with a text document editing application and needs to input lots of characters. It is not efficient to use a phone for this type of work. With this solution, the user can use another device that supports internet connectivity to connect to the phone and use it as an external display. For example, the user may have a notebook computer within reach. To use it for this work, the user just needs to use the notebook's camera to scan the QR code displayed on the phone. Then, a browser in the notebook computer will open and the notebook's screen can be used as an external display for the remote desktop. Meanwhile, the user may drag the text document to the notebook screen and use that notebook's keyboard for input. Further, there is no specific requirement for the added device's system, it could be a Windows desktop, a Mac computer, an Android notebook, or a device with another operating system.

Thus, with this approach, there is no need to install any extra software to the added device. The user can take advantage of a better screen and input capabilities of an added device. And the system can be implemented without adding extra complexity to the existing virtual desktop system; new functionality to the virtual desktop client application only needs to be added.

Figure 1:
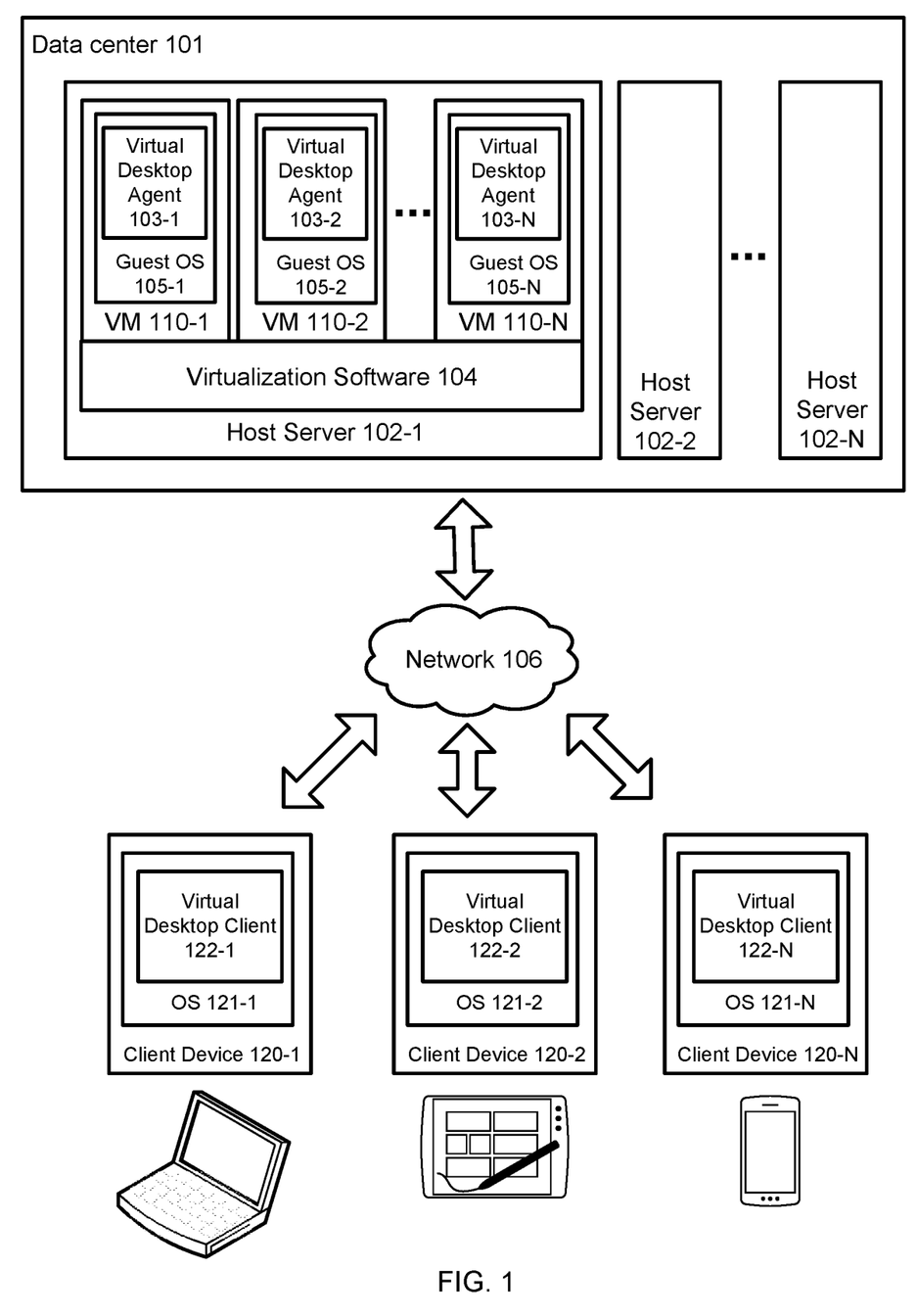
FIG. 1 illustrates an example of a virtual desktop environment, in accordance with various embodiments.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the virtual desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local client device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each VM hosting a desktop for each individual user. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In one embodiment, the interaction is performed by the virtual desktop agent transmitting encoded visual display information (e.g., framebuffer pixel data) over the network to the virtual desktop client and the virtual desktop client in turn transmitting user input events (e.g. keyboard, mouse, touch input events) to the remote desktop agent. Interactions between the virtual desktop client (e.g., 122-1, 122-2, 122-N) and the virtual desktop agent (e.g. 103-1, 103-2, 103-N), including transmission of encoded visual display information from the agent to the client and user input events from the client to the agent can be performed using a remote desktop protocol, such as Remote Desktop Protocol (RDP), PC-over-IP protocol (PCoIP), VMware Blast protocol, virtual network computing (VNC) protocol, or the like.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment might include many more host servers, which may be distributed over multiple data centers, which can include many other types of devices, such as switches, power supplies, cooling systems, environmental controls, and the like, which are not illustrated herein. Similarly, a single host server would typically host many more virtual machines than the number shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
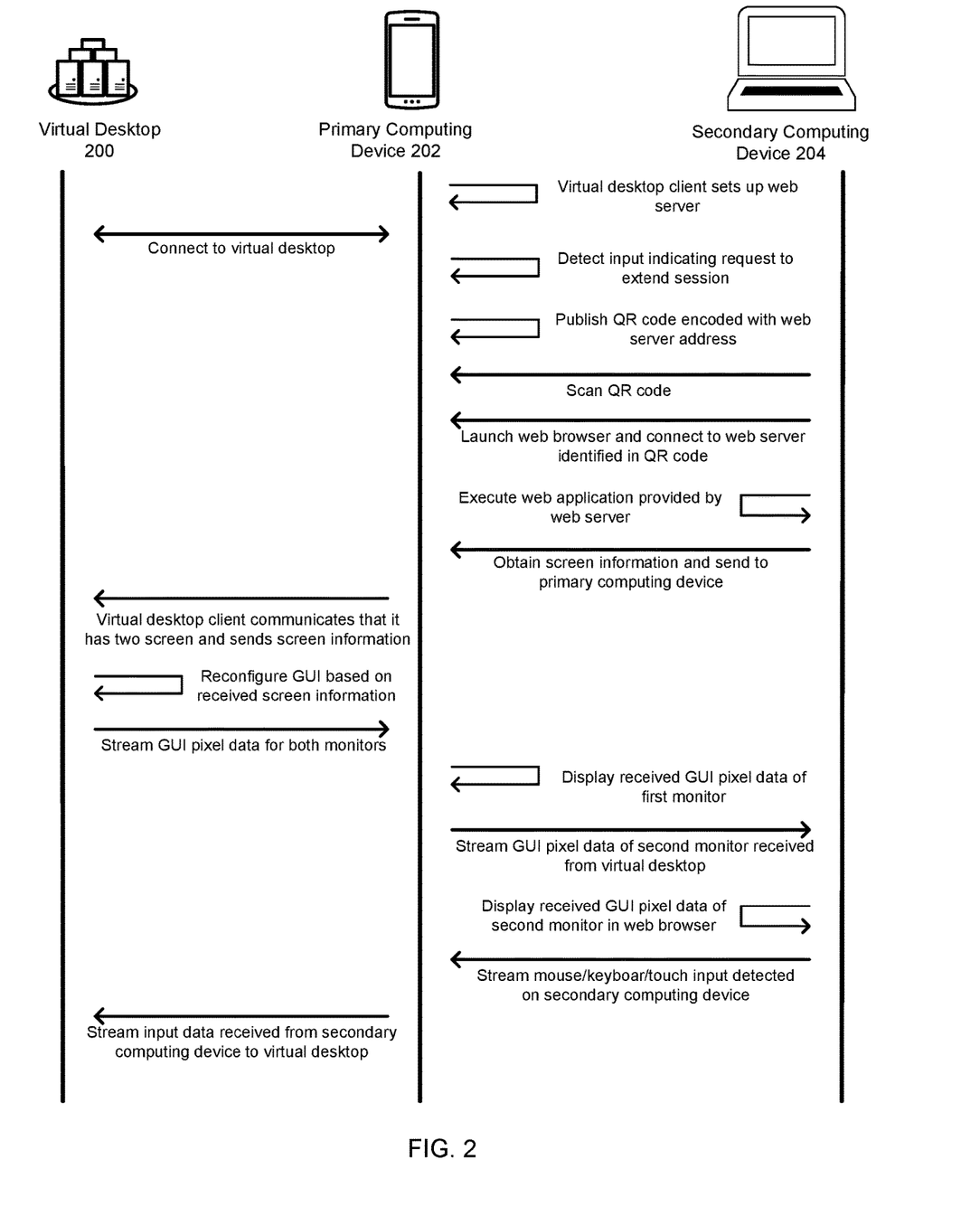
FIG. 2 illustrates an example of communications flow between the virtual desktop, the primary computing device and a secondary computing device, in accordance with various embodiments.

FIG. 2 illustrates an example of communications flow between the virtual desktop, the primary computing device and a secondary computing device, in accordance with various embodiments. The primary computing device 202 can be any computing device having a virtual desktop client application installed thereon. In one embodiment, the primary computing device 202 is the session user's smartphone, however in alternative embodiments, the primary computing device may be a tablet computer or any other device capable of having a virtual desktop client application installed thereon such as a laptop or desktop computer.

In various embodiments, the virtual desktop client application is downloaded and installed on primary computing device 202. As shown in the figure, when the virtual desktop client application is launched, the virtual desktop client application sets up a web server on the primary computing device 202 that will be used for extending the virtual desktop to other devices. The web server is configured to host a web application that can be executed on a secondary computing device to enable extended virtual desktop sessions on the devices.

Before the virtual desktop session can be extended, the virtual desktop client application on the primary computing device 202 needs to connect to the virtual desktop 200. Once the connection is made, the virtual desktop client on the primary computing device 202 can accept input to extend the virtual desktop session with a secondary computing device. In one embodiment, a user interface (UI) widget for extending a desktop is displayed to the user in the GUI of the virtual desktop. When the user clicks on the UI widget indicating that the virtual desktop session is to be extended, a QR code (or other encoded image) is displayed on the display screen of the primary computing device 202 (e.g. shown in a popup dialog box). The QR code is encoded with information identifying the web server (e.g. IP address of the web server) established by the virtual desktop client on the primary computing device 202.

Once the QR code is displayed, a secondary computing device in proximity of the primary computing device 202 may be used to scan the QR code. As shown in the illustration, the secondary computing device 204 is used to scan the QR code. The secondary computing device 204 may be any computing device that is equipped with a digital camera and QR scanning software, as well as capable of accessing the Internet. For example, the secondary computing device 204 may be a laptop or desktop computer with a larger viewing screen, or better input capabilities (mouse, keyboard, touch, etc.) than the primary computing device 202. Hence, a user of the primary computing device 202 may desire to extend the virtual desktop 202 session with the secondary computing device 204, to take advantage of the features of the secondary computing device 204. QR codes will be described in further detail with reference to FIG. 3. Scanning the QR code causes a web browser to be launched on the secondary computing device 204. The web browser on the secondary computing device 204 connects to the web server operating on the primary computing device 202 (e.g., by establishing an HTTPS connection) then loads and executes the web application provided by the web server.

As illustrated, once executed on the secondary computing device 204, the web application obtains display screen information from the secondary computing device 204 and sends the screen information to the virtual desktop client on the primary computing device 202. Such information may include information such as screen resolution, height and width in pixels (e.g., 1920×1080), and/or any other information that may be used by the virtual desktop for reconfiguring the GUI to include a monitor for the secondary computing device 204. The virtual desktop client application on the primary computing device 202 then communicates to the virtual desktop that it has two screens and provides information for the screens, as illustrated in the figure. For example, the virtual desktop client may communicate that it has two screens, one with a 640×480 resolution (corresponding to the primary computing device 202) and one with a 1920×1080 resolution (corresponding to the secondary computing device 204).

In this part of the process, various other topology information may be provided to the virtual desktop regarding the layout of the GUI. Such topology information may include any information useful for configuring the GUI for multiple monitors, such as the position of the monitors relative to each other (e.g., which monitors are on right or left of each other, or on top or bottom of each other), and/or the pivot or orientation of monitors (which monitors are in horizontal orientation, which monitors are in vertical orientation), which monitor should be primary, etc. Also, the topology information may indicate whether the GUI should be extended across monitors (so that each monitor shows a different part of the GUI) or whether the GUI should be duplicated on each monitor (so that each monitor shows the same part of the GUI or the entire GUI). Any such topology information may be obtained by prompting the user to provided it via a UI widget displayed in the GUI of the virtual desktop. For example, many operating systems which may be implemented as the guest operating system of the virtual desktop 200 have a built-in procedure that inquires a user about this type of topology information when configuring the GUI for a multi-monitor layout.

Based on the screen and topology information received from the virtual desktop client, the virtual desktop 200 is reconfigured to produce its GUI on two monitors, a first monitor corresponding to the display screen of the primary computing device 202 and a second monitor corresponding to the display screen of the secondary computing device 204. As illustrated, after the GUI of the virtual desktop is reconfigured for two monitors, the pixel data for each of the two monitors is streamed to the virtual desktop client. The pixel data of the first monitor of the GUI received at the primary computing device 202 is displayed on the display screen of the primary computing device 202 by the virtual desktop client.

When the pixel data of the second monitor of the GUI is received at the virtual desktop client on the primary computing device 202, the data is immediately pushed by the client to the secondary computing device. The virtual desktop client transmits the pixel data of the second monitor of the GUI to the secondary computing device over the web connection established between the web browser of the secondary computing device 204 and the web server operating on the primary computing device 202. The connection may be an HTTPS connection or a Web Socket. As illustrated, the pixel data of the second monitor of the GUI received at the primary computing device 202 is then displayed on the display screen of the secondary computing device 204 by the web application in the web browser. The virtual desktop client operates in this push mode (instead of a pull mode) to improve performance and reduce latency.

Thus, the virtual desktop GUI data received at the secondary computing device 204 is the pixel data received from the virtual desktop 200 corresponding to the second monitor of the GUI as part of the virtual desktop session established by the virtual desktop client. Streaming this GUI data enables the secondary computing device 204 to display the same virtual desktop session being accessed by the primary computing device 202. Further, the secondary computing device 204 may display the same part of the virtual desktop GUI as the primary computing device 202, if the virtual desktop 200 is configured to duplicate the GUI on both monitors (e.g., both devices may display the entire GUI). Alternatively, the secondary computing device 204 may display a different part of the virtual desktop GUI than the primary computing device 202, if the virtual desktop 200 is configured to extend the GUI across the monitors. In one embodiment, the virtual desktop client on the primary computing device 202 also begins streaming the audio playback data of the virtual desktop 200 to the secondary device 204. This effectively extends the virtual desktop session from the primary computing device 202 to the secondary computing device 204. During this extended session, the web application executing on the secondary computing device 204 draws the virtual desktop screen updates corresponding to the second monitor and plays the audio stream received from the primary computing device 202.

Additionally, the web application captures input data on the secondary computing device 204, such as mouse/keyboard/touch input events and streams the input data to the primary computing device 202 via the connection between the web server on the primary computing device 202 and the web application on the secondary computing device 204. The received input captured on the secondary computing device 204 is then streamed to the virtual desktop 200 from the primary computing device 202. The virtual desktop client on the primary computing device 202 can also perform any necessary processing on the received inputs captured on the secondary computing device 204 before transmitting them to the virtual desktop 200, such as recalculating coordinates of mouse events. As illustrated, the secondary computing device 204 input data is then provided to the guest operating system of the virtual desktop 202 as local inputs. The inputs cause updates to the GUI of the virtual desktop 202 and these updates (for both monitors) are streamed back to the primary computing device 202, and then the GUI updates corresponding to the second monitor are forwarded to the web browser in the secondary computing device 204. In various embodiments, the inputs captured on the primary computing device 202 continue to be streamed to the virtual desktop 202 along with the inputs captured on and received from the secondary computing device 204 and be provided to the guest operating system of the virtual desktop 202 as local inputs, causing updates to the GUI of the virtual desktop 202. Further, in various embodiments, the user is able to disconnect the virtual desktop session at any time from either computing device, for example, by logging out of the virtual desktop from either the primary computing device 202 or from the secondary computing device 204.

In this manner, both the primary computing device 202 and the secondary computing device 204 are able to view the virtual desktop session and control the session, all without the need to install any virtual desktop client application or other software on the secondary computing device 204. Either device can also terminate the extended session at any time. In various embodiments, additional devices (e.g., third, fourth, fifth device, etc.) can be added to the session in the manner described above so that the session GUI is displayed on each of the three or more device's display screens (either extended across each device's screen or duplicated on each screen) and inputs are conveyed into the virtual desktop from each device.

Figure 3:
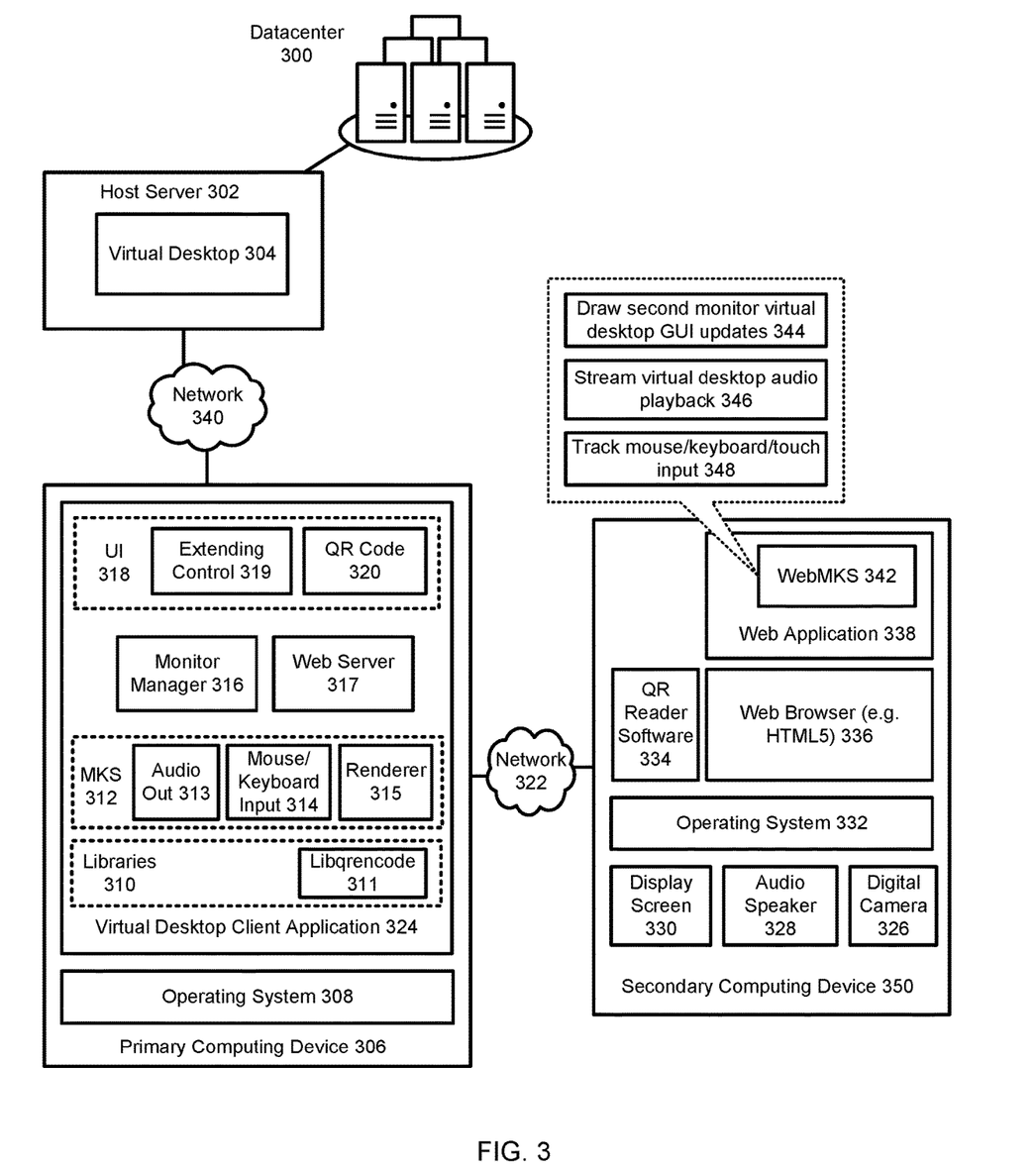
FIG. 3 illustrates the components on the primary computing device and the secondary device that enable cross-device extended virtual desktops, in accordance with various embodiments.

FIG. 3 illustrates the components on the primary computing device and the secondary device that enable cross-device extended virtual desktops, in accordance with various embodiments. As illustrated, the primary computing device 306 can be any computing device capable of executing a virtual desktop client application 324. In the illustrated embodiment, the primary computing device 306 can be any computing device having an operating system 308, such as Microsoft Windows, Linux, iOS, Android or other. However, the invention is envisioned to be particularly beneficial in cases where the primary computing device 306 is a mobile device with a mobile operating system 332 (e.g. iOS, Android, etc.), such as a smartphone or tablet. A user may start the virtual desktop client application 324 to connect to their virtual desktop 304 running on a remote host server 302 (housed in a data center 300) using a network connection 340.

When the virtual desktop client application 324 starts up, it also sets up a web server 317, which is configured to provide the web application 338 used for enabling an extended virtual desktop session with other devices (e.g., with the secondary computing device 350). The web server 317 may be a module developed using NodeJS and providing an HTTPS service for any extended devices (e.g., the secondary computing device 350). The web server 317 also hosts the web application 338 that will run on the secondary computing device's 350 browser 336. The web server 317 receives video and audio streams coming from the Mouse/Keyboard/Screen (MKS) module 312 and streams them to the secondary computing device 350. Similarly, the web server 317 receives the mouse/keyboard/touch input events captured on the secondary computing device and sends this input data to the MKS module 312.

In various embodiments, the virtual desktop client application 324 includes the MKS module 312, which enables the primary computing device 306 to render the screen of the virtual desktop, play the audio out stream received from the virtual desktop, and capture mouse and keyboard input to be sent to the virtual desktop 304. Conventionally, the MKS of a virtual desktop client would only render the virtual desktop GUI updates on the local device (i.e., on the primary computing device 306). Similarly, MKS conventionally would only track user's input on the local device (i.e., on the primary computing device 306). In this illustration however, to enable extending of the virtual desktop with other devices, the MKS module 312 is further configured to communicate with the monitor manager 316. More particularly, the audio out 313 of the MKS module 312 is modified by adding an interface to stream a duplicate copy of the audio out stream (received from the virtual desktop) to the monitor manager 316 in addition to locally playing the audio out stream on the primary computing device 306. The monitor manager 316 in turn sends the duplicate audio out stream to the web server 317, to be transmitted to the secondary computing device 350 over the established connection (e.g., Web Socket). In addition, the mouse/keyboard input 314 of the MKS module 312 is modified to accept input data from the monitor manager 316, which the monitor manager 316 receives from the secondary computing device 350 over the web server 317. More specifically, input is captured on the secondary computing device 350 by the WebMKS module 342 (as described below) and the WebMKS module 342 streams those input events to the web server 317 via the Web Socket. The web server 317 delivers these events to the monitor manager 316, which in turn provides the input data to the MKS module 312. The inputs from the secondary computing device 350, as well as from the primary computing device 306, are then conveyed to the virtual desktop 304. Finally, the renderer 315 of the MKS module 312 is also modified by adding an interface to communicate with the monitor manager 316 and the web server 317, and by adding logic to split the virtual desktop 304 GUI updates into updates for the first monitor (for the primary computing device 306) and the second monitor (for the secondary computing device 350). The virtual desktop GUI updates for the second monitor are then streamed to the secondary computing device 350 by way of the monitor manager 316 and the web server 317.

Once the virtual desktop client application 324 connects to the virtual desktop 304, the user of the desktop session is able to provide input indicating that the session is to be extended with another device (the secondary computing device 350). For example, the user may click on a "Extend this Desktop Session" button displayed by the virtual desktop client application 324 on the primary computing device 306. When such input is detected, the QR software (e.g. libqrencode 311) on the primary computing device 306 generates a QR code 320 having information identifying the web server 317 and displays the QR code 320 on the user interface (UI) 318 of the virtual desktop.

A QR code is a type of well-known and widely available matrix barcode (or two-dimensional barcode) which is often used for product tracking or item identification. In most use cases, QR codes are used as machine-readable optical labels that contain information about the item to which they are attached. The QR code encodes data into an image which can be read by another machine. In various embodiments described herein, the QR code can be used to transmit data from one device to another. In the illustrated embodiment, the QR code can be displayed on the display screen of a primary client device 306 (e.g., a smartphone, tablet, etc.) and be encoded with information that identifies the web server 317 operating on the primary computing device 306.

QR codes can generally be encoded with many different types of information. By way of example for purposes of this disclosure, the QR code may be encoded with a unique device identifier (ID), Internet Protocol (IP) address and one-time use token, among other types of information. In the illustrated embodiment, the QR code 320 is encoded with the IP address of the web server 317 by the primary computing device 306 using QR software, which can be implemented using any freely available QR code generator software, such as libqrencode 311. In some embodiments, the QR software may be integrated and provided to the primary computing device 306 along with the virtual desktop client application 324.

The output of the QR encoder library may be RGB data. To simplify the implementation, a bitmap object can be constructed with the output and a picture of it may be drawn using graphic APIs provided by the system. The content encoded in the QR code may be formatted in the following manner: "https://10.112.119.95:8057" where 10.112.119.95 is the IP address of the primary computing device 306 and 8057 is the specified port of the web server 317. In some embodiments, the QR code 320 may also include a one-time use token for security purposes. In these embodiments, besides the server address, the QR code 320 may contain a random string as a token for a session. If an extended session is successfully set up, the token will expire, i.e. become unavailable for future connections. It should be noted that QR codes is only one example of an image scanning technique. In other embodiments, other technologies involving data encoded into images can be used to perform similar functions instead of QR codes.

Once displayed, the QR code may be scanned using a digital camera 326 of a secondary computing device 350. For example, the user may launch a QR reader application that displays the live camera view of the secondary computing device 350 and aim the camera 326 of the secondary computing device 350 at the QR code 320 in order to place the QR code 320 within the field of view (FOV) of the digital camera 326 and to enable the secondary computing device 350 to scan the QR code 320. The secondary computing device 350 may contain QR reader (or QR scanning) software 334 to scan the QR code 320 and to decode the information encoded therein. One example of such a QR code reader software 334 is ZBar which is a C barcode reading library with C++, Python, Perl, and Ruby bindings.

As previously mentioned, the secondary computing device 350 may be any device equipped with a multimedia accessory, such as a digital camera 326, audio speaker 328 and display screen 330. In some embodiments, the secondary computing device 350 may be within certain threshold physical vicinity of the primary computing device 306. In other embodiments, the proximity of the secondary computing device 350 is not important and the secondary computing device 350 may be located anywhere if it is capable of establishing a network connection. In some embodiments, the secondary computing device 350 may be located on the same subnet as the primary computing device 306. In other embodiments, the devices may be located on different subnets.

In the illustrated embodiment, the secondary computing device 350 includes an operating system (OS) 332 (e.g. Microsoft Windows, Linux, iOS, Android, etc.) and supports a web browser 336 (e.g., HTML5). When the user uses the secondary computing device 350 to scan the QR code 320 displayed on the primary computing device 306, the web browser 336 is launched. The web browser 336 of the secondary computing device 350 connects to the web server 317 over the network connection 322 (e.g., Web Socket connection) and runs the web application 338 inside the web browser 336 on the secondary computing device 350. The web application 338 is configured to establish the extended session. To do this, the web application 338 transmits a request to the web server 317 to access the virtual desktop.

In one embodiment, a core component of the web application 338 is the Web Mouse/Keyboard/Screen (WebMKS) module 342. The WebMKS module 342 is configured to draw virtual desktop GUI updates 344 for the second monitor as well as play the virtual desktop audio out stream 346, both of which are streamed to it by the primary computing device 306 via the WebSocket connection. Also, the WebMKS module 342 is configured to collect the screen size information about the display screen of the secondary computing device 350 and send it to the primary computing device 306, so that the client application 324 can use this information along with the display screen size of the primary computing device 306 to request the virtual desktop to reconfigure its GUI with two monitors for the correct screen size and resolution of the corresponding primary and secondary computing devices 306, 350. In addition, the WebMKS 342 is configured to capture any mouse/keyboard/touch input 348 that is entered on the secondary computing device 350 and stream the input to the primary computing device 306. The client application 324 receives the input, re-calculates the position as necessary, and finally sends it to the remote desktop 304. The monitor manager 316 receives screen size information about the display screen of the secondary computing device 350 and provides it to the MKS module 312 for point position calculation.

In some cases, position may need to be recalculated for mouse/touch/pen events. The monitor manager 316 records the screen size information about the display screen of the secondary computing device 350 as well as the resolution of the remote desktop GUI. Remapping may not be necessary when the pixel height and width of the second monitor of the GUI matches the display window size of the secondary device, since each point on the secondary device's window is in a 1-1 mapping with the second monitor of the remote desktop GUI.

In some cases, however, the pixel height and/or width of the second monitor of the GUI may not match the display window of the secondary device. For example, this may happen when the secondary device window size is beyond the capability of the remote virtual desktop and the remote desktop picture is stretched to fill the window, or when a user zooms in/out on the screen. In this case, the point of a mouse/touch/pen event on the secondary computing device may need to be remapped to the pixel position of the remote desktop GUI. For example, the secondary device screen window size may be 2000×1000 and the actual pixel resolution of the remote desktop may be 1000×500. If a mouse down event happened at the center point of the secondary device window, the original position received will be (1000, 500). The position needs to be re-calculated to map it to the center point of the remote desktop GUI's second monitor, which means that the position of the mouse down event that should be sent to the remote side is (500, 250). For example, the below formulas can be used for point position calculation, where the coordinates of the event on the secondary device screen are (orgPoint.X, orgPoint.Y), the resolution of the remote desktop second screen is (pixelWidth, pixelHeight), the resolution of the secondary device screen is (WindowWidth, WindowHeight), and the remapped coordinates to the virtual desktop are (RemoteX, RemoteY).

$$RemoteY = orgPoint.Y * pixelHeight / WindowHeight;$$

$$RemoteX = orgPoint.X * pixelWidth / WindowWidth;$$

Once the request to access the virtual desktop is received from the secondary computing device 350 by the primary computing device 306, the request is accepted. In an embodiment, before accepting the request, the user can be prompted on the primary computing device 306 to confirm extending the session with the secondary computing device 350. In one such embodiment, the monitor manager 316 displays a message prompting the user for such confirmation and indicating the identifying information about the secondary computing device 350. For example, the monitor manager 316 can use an extending control 319 portion of the user interface 318 in order to display the prompt. When the request is received, a popup dialog box may be launched on the primary computing device 306, showing identifying information about the secondary computing device 350 and asking the user for confirmation. The user of the primary computing device 306 can then approve or deny the request by using the extending control 319.

Once the request from the secondary computing device 350 to access the virtual desktop is accepted and the connection between the secondary computing device 350 and the web server 317 is established, the screen size information about the display screen of the secondary computing device 350 (collected by the WebMKS module 342) is conveyed to the primary computing device 306 over the established connection. The client application 324 communicates to the virtual desktop 304 that it has two screens and provides the screen information for each screen. In response, the virtual desktop 304 reconfigures its GUI to produce the GUI on two monitors, the first monitor corresponding to the display screen of the primary computing device 306, and the second monitor corresponding to the display screen of the secondary computing device 350. Further, when reconfiguring the GUI, the virtual desktop 304 (e.g., via the guest operating system on the virtual desktop 304) can request the user to input various topology information, as the operating system would normally when multi-monitor configuration is requested, such as the relative position of the monitors, which is monitor is primary, whether the monitors are duplicated or extended, and so on. Once the GUI is reconfigured for two monitors, as described above, the GUI updates for both monitors are streamed to the client application 324 and the virtual desktop GUI updates for the second monitor are then streamed to the secondary computing device 350 from the primary computing device 306 by way of the monitor manager 316 and the web server 317, to be rendered in the display screen of the second computing device 350.

In various embodiments, the monitor manager 316 connects the UI 318, the MKS module 312 and the web server 317 to enable virtual desktop extending with the secondary computing device 350. For the UI 318, the monitor manager 316 provides the current extended session information, which enables the user to view to which device(s) the session is extended. At the same time, the monitor manager 316 accepts the user's control input from the UI 318, such as to disconnect the extended device (e.g., to disconnect the second computing device 350 from the session). For the MKS module 312, the monitor manager 316 receives the virtual desktop GUI updates for both monitors and the audio out data from the MKS module 312, and streams the GUI updates for the second monitor and the audio out data to the secondary computing device 350 by way of the web server 317. The monitor manager 316 also receives input captured on the secondary computing device 350 and delivers the input events to the MKS module 312.

Figure 4A:
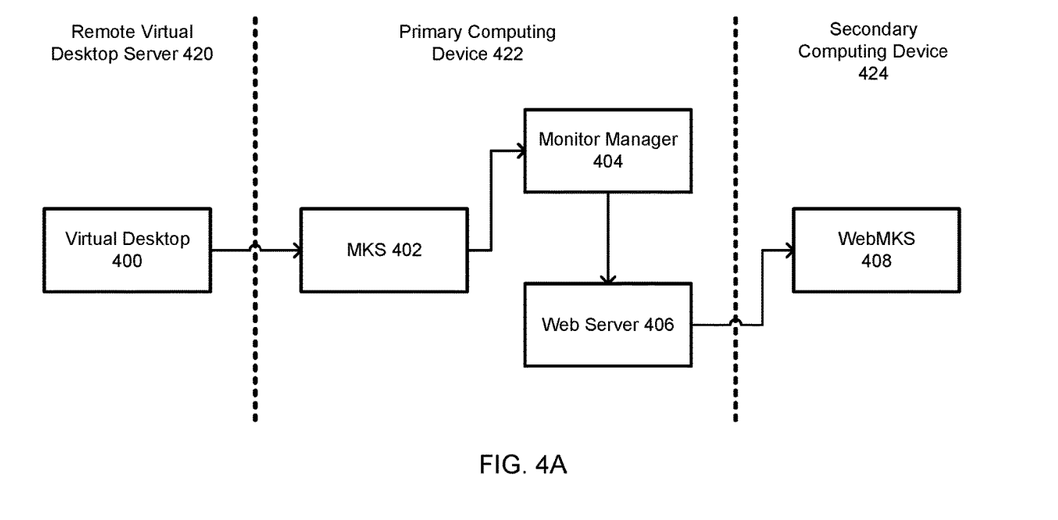
FIG. 4A illustrates an example of the virtual desktop GUI data being transmitted during a cross-device extended session, in accordance with various embodiments.

FIG. 4A illustrates an example of the virtual desktop GUI data being transmitted during a cross-device extended session, in accordance with various embodiments. In the example of FIG. 4A, the virtual desktop 400 is configured to produce its GUI on two monitors, a first monitor for the primary computing device 422, and a second monitor for the secondary computing device 424. As shown in this illustration, the virtual desktop 400 GUI data for both monitors is generated on the remote virtual desktop server 420. In one embodiment, the virtual desktop GUI data is the framebuffer pixel data that is generated by the guest operating system on a virtual machine on the server. The GUI data for both monitors is then transmitted from the virtual desktop 400 to the MKS module 402 on the client computing device 422. The MKS module 402 splits the virtual desktop GUI data into updates for the first monitor (for the primary computing device 422) and updates for the second monitor (for the secondary computing device 424). The MKS module 402 sends the virtual desktop GUI data of the second monitor to the monitor manager 404 and the monitor manager sends this data to the web server 406. Each of the MKS module 402, the monitor manager 404 and the web server 406 reside on the client computing device 422. The web server 406 then transmits the GUI data for the second monitor over the network to the WebMKS module 408 residing on the mobile device 424 to be displayed thereon. At the same time, the GUI data of the first monitor is displayed on the primary computing device 422.

Figure 4B:
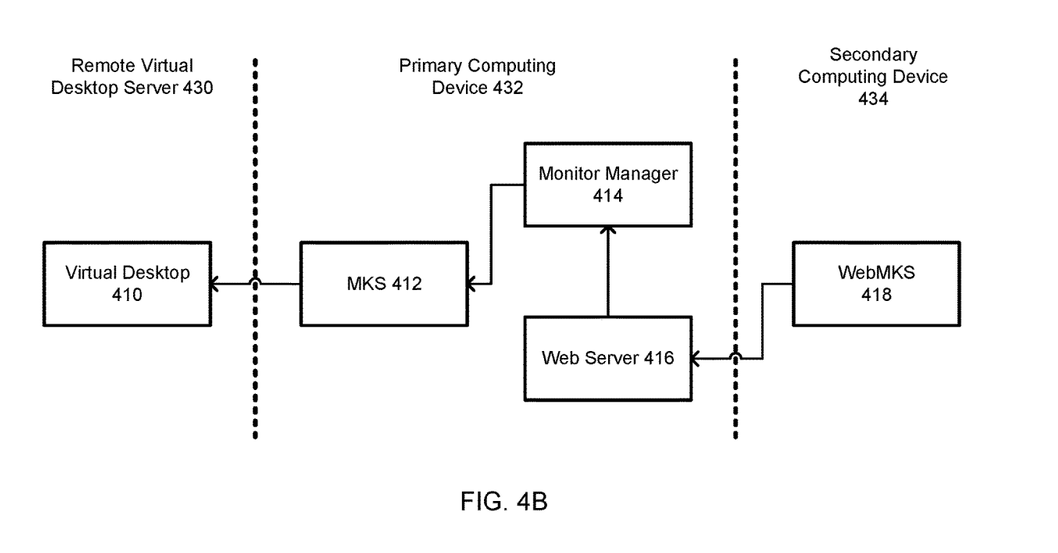
FIG. 4B illustrates an example of the input data that may be transmitted during a cross-device extended session, in accordance with various embodiments.

FIG. 4B illustrates an example of the input data that may be transmitted during a cross-device extended session, in accordance with various embodiments. As shown, the input data (mouse/keyboard/touch input events) are captured on the secondary computing device by the WebMKS module 418. The WebMKS module 418 transmits the input data over the network to the web server 416 operating on the primary computing device 432. The web server 416 relays the input data to the monitor manager 414 and the monitor manager 414 sends the input data to the MKS module 412. The MKS module 412 then transmits the input data over the network to the virtual desktop 410 on the remote server 430 as though the inputs were entered on the primary computing device 432.

Figure 5:
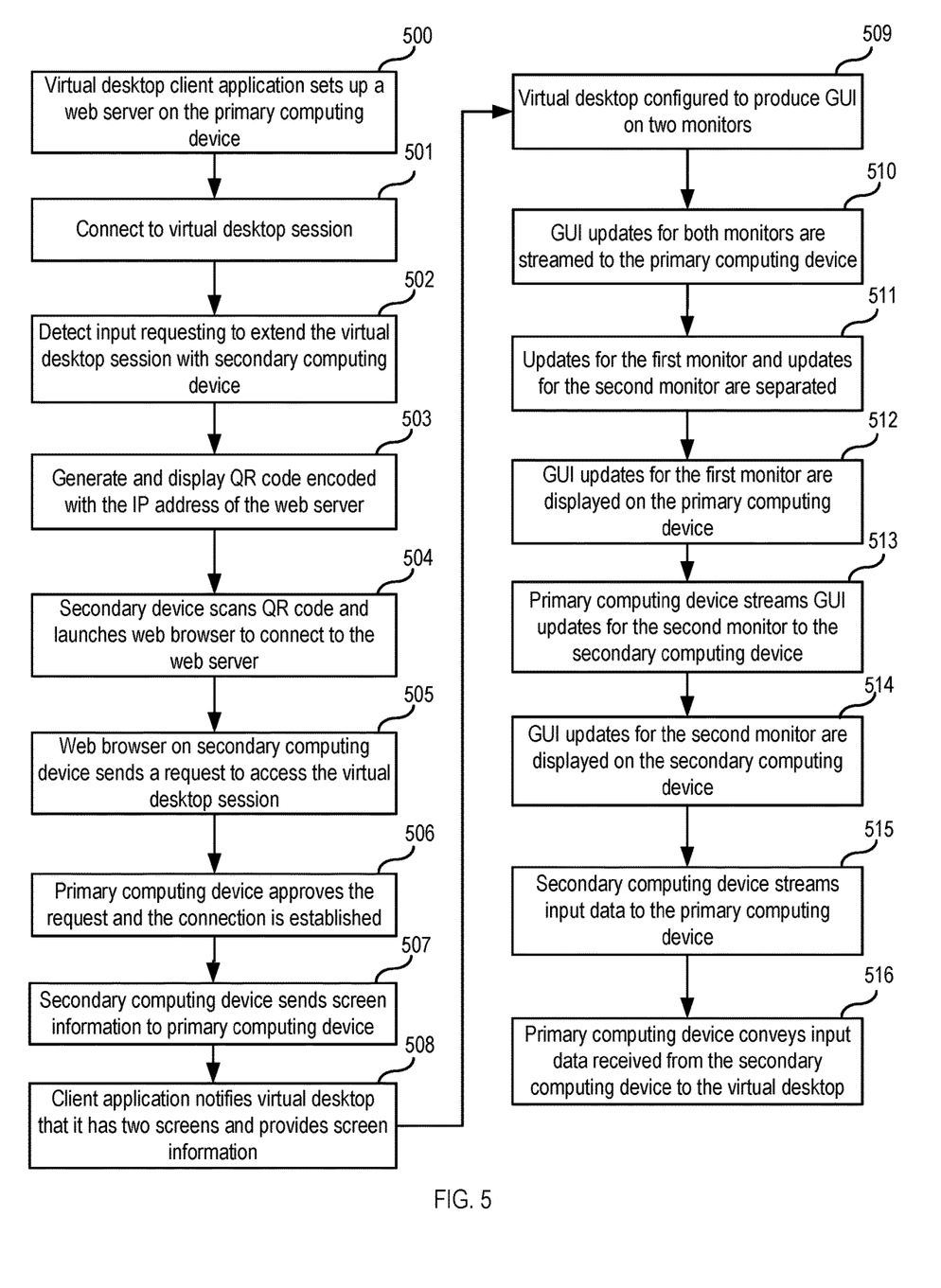
FIG. 5 illustrates an example of a process flow for enabling cross-device extended virtual desktop, in accordance with various embodiments.

FIG. 5 illustrates an example of a process flow for enabling cross-device extended virtual desktops, in accordance with various embodiments. As shown in operation 500, the process begins by the virtual desktop client application establishing the web server on the primary computing device. In operation 501, the virtual desktop client application connects to the virtual desktop session. In operation 502, the virtual desktop client application detects input requesting to extend the current virtual desktop session with a secondary computing device. In operation 503, the virtual desktop client application generates a QR code (or similar encoded image) and displays the QR code on the display screen of the primary computing device. The QR code is encoded with the IP address and/or other information identifying the web server established on the primary computing device. In operation 504, a secondary computing device scans the QR code and in response launches a web browser. The web browser connects to the web server operating on the primary computing device and executes a web application provided by the web server. In operation 505, the web application executing inside the web browser sends a request to access the virtual desktop session to the web server operating on the primary computing device. In operation 506, the primary computing device approves the request and the connection with the secondary computing device is established. In operation 507, the web application executing on the secondary computing device collects information about the screen of the secondary computing device (such as the screen resolution/size) and conveys the screen information to the primary computing device. In operation 508, the client application on the primary computing device notifies the virtual desktop that it has two screens and provides information for each screen, such as the resolution/size. In response to the notification from the client, in operation 509, the virtual desktop is configured to produce its GUI on two monitors, a first one for the primary computing device and a second one for the secondary computing device. In operation 510, the GUI updates for both monitors are streamed to the primary computing device from the remote desktop. In operation 511, the GUI updates for both monitors are separated at the primary computing device into updates for the first monitor and updates for the second monitor. In operation 512, the GUI updates for the first monitor are displayed on a screen of the primary computing device. In operation 513, the primary computing device streams the GUI updates for the second monitor to the secondary computing device. In operation 514, the GUI updates for the second monitor are displayed on a screen of the secondary computing device. In operation 515, the secondary computing device streams input data to the primary computing device. In operation 516, the primary computing device conveys the input data received from the secondary computing device to the virtual desktop.

Figure 6:
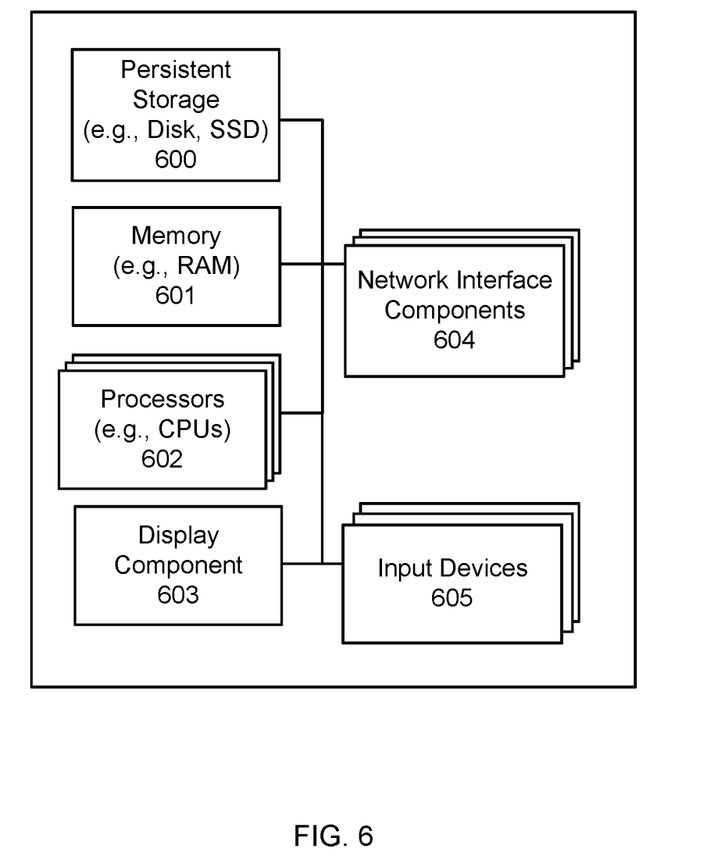
FIG. 6 illustrates an example of some general components of a computing device, in accordance with various embodiments.

FIG. 6 illustrates an example of some general components of a computing device, in accordance with various embodiments. In this particular example, the device includes one or more processors (e.g., central processing units (CPUs) 602 for executing instructions that can be stored in a storage medium component. The storage medium can include many types of memory, persistent data storage, or non-transitory computer-readable storage media. For example, the storage medium may take the form of random access memory (RAM) 601 storing program instructions for execution by the processor(s) 602, a persistent storage (e.g., disk or SSD) 600, a removable memory for sharing information with other devices and/or the like. The computing device typically can further comprise a display component 603, such as a monitor, a touch screen, liquid crystal display (LCD), or the like. In various embodiments, the computing device will include at least one input device 605 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 604 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for extending a virtual desktop session with monitors of different computing devices via image scanning, the method comprising:

executing a virtual desktop client on a primary computing device, the virtual desktop client being configured to access the virtual desktop session with a virtual desktop hosted on a remote server over a network connection;

establishing a web server on the primary computing device by the virtual desktop client, wherein the web server is configured to provide a web application for streaming pixel data of a graphical user interface (GUI) of the virtual desktop session to a requesting computing device;

detecting input indicating that the virtual desktop session is to be extended with a secondary computing device that is used as an additional monitor for the virtual desktop session;

displaying an encoded image on the primary computing device by the virtual desktop client, wherein the encoded image is encoded with information identifying the web server established by the virtual desktop client on the primary computing device;

receiving at the primary computing device a request from the secondary computing device to access the virtual desktop, wherein the request is transmitted by the web application that is launched on a web browser of the secondary computing device in response to the secondary computing device scanning the encoded image displayed by the virtual desktop client;

configuring the virtual desktop to produce the GUI of the virtual desktop session on a first monitor corresponding to the primary computing device and on a second monitor corresponding to the secondary computing device; and streaming pixel data of the second monitor of the GUI of the virtual desktop session to the secondary computing device over a web connection established between the web browser of the secondary computing device and the web server operating on the primary computing device.

2. The method of claim 1, wherein pixel data of the first monitor of the GUI of the virtual desktop session is displayed on a display screen of the primary computing device by the virtual desktop client.

3. The method of claim 1, wherein the pixel data of the second monitor of the GUI of the virtual desktop session is displayed on a display screen of the secondary computing device by the web application executing in the web browser of the secondary computing device.

4. The method of claim 1, further comprising:
receiving input data captured on the secondary computing device from the web browser of the secondary computing device, the input data including at least one of touch input, keyboard, or mouse events; and
transmitting the input data by the virtual desktop client to the virtual desktop hosted on the remote server.

5. The method of claim 1, further comprising:
receiving screen resolution information from the secondary computing device; and
transmitting the screen resolution information by the virtual desktop client to the virtual desktop hosted on the remote server.

6. The method of claim 1, wherein the GUI of the virtual desktop is extended across the first monitor and the second monitor.

7. The method of claim 1, wherein the encoded image is a Quick Response (QR) code).

8. A computing device for extending a virtual desktop session with monitors of different computing devices via image scanning, comprising:

at least one processor; and
memory including instructions that, when executed by the at least one processor, cause the computing device to perform the steps of:
executing a virtual desktop client on a primary computing device, the virtual desktop client being configured to access the virtual desktop session with a virtual desktop hosted on a remote server over a network connection;
establishing a web server on the primary computing device by the virtual desktop client, wherein the web server is configured to provide a web application for streaming pixel data of a graphical user interface (GUI) of the virtual desktop session to a requesting computing device;
detecting input indicating that the virtual desktop session is to be extended with a secondary computing device that is used as an additional monitor for the virtual desktop session;
displaying an encoded image on the primary computing device by the virtual desktop client, wherein the encoded image is encoded with information identifying the web server established by the virtual desktop client on the primary computing device;
receiving at the primary computing device a request from the secondary computing device to access the virtual desktop, wherein the request is transmitted by the web application that is launched on a web browser of the secondary computing device in response to the secondary computing device scanning the encoded image displayed by the virtual desktop client;
configuring the virtual desktop to produce the GUI of the virtual desktop session on a first monitor corresponding to the primary computing device and on a second monitor corresponding to the secondary computing device; and
streaming pixel data of the second monitor of the GUI of the virtual desktop session to the secondary computing device over a web connection established between the web browser of the secondary computing device and the web server operating on the primary computing device.

9. The computing device of claim 8, wherein pixel data of the first monitor of the GUI of the virtual desktop session is displayed on a display screen of the primary computing device by the virtual desktop client.

10. The computing device of claim 8, wherein the pixel data of the second monitor of the GUI of the virtual desktop session is displayed on a display screen of the secondary computing device by the web application executing in the web browser of the secondary computing device.

11. The computing device of claim 8, wherein the memory further includes instructions that when executed by the at least one processor, cause the computing device to perform the steps of:
receiving input data captured on the secondary computing device from the web browser of the secondary computing device, the input data including at least one of touch input, keyboard, or mouse events; and
transmitting the input data by the virtual desktop client to the virtual desktop hosted on the remote server.

12. The computing device of claim 8, wherein the memory further includes instructions that when executed by the at least one processor, cause the computing device to perform the steps of:

receiving screen resolution information from the secondary computing device; and transmitting the screen resolution information by the virtual desktop client to the virtual desktop hosted on the remote server.

13. The computing device of claim 8, wherein the GUI of the virtual desktop is extended across the first monitor and the second monitor.

14. The computing device of claim 8, wherein the encoded image is a Quick Response (QR) code).

15. A non-transitory computer readable storage medium for extending a virtual desktop session with monitors of different computing devices via image scanning, comprising one or more sequences of instructions, the instructions when executed by one or more processors causing the one or more processors to execute the operations of:

executing a virtual desktop client on a primary computing device, the virtual desktop client being configured to access the virtual desktop session with a virtual desktop hosted on a remote server over a network connection;

establishing a web server on the primary computing device by the virtual desktop client, wherein the web server is configured to provide a web application for streaming pixel data of a graphical user interface (GUI) of the virtual desktop session to a requesting computing device;

detecting input indicating that the virtual desktop session is to be extended with a secondary computing device that is used as an additional monitor for the virtual desktop session;

displaying an encoded image on the primary computing device by the virtual desktop client, wherein the encoded image is encoded with information identifying the web server established by the virtual desktop client on the primary computing device;

receiving at the primary computing device a request from the secondary computing device to access the virtual desktop, wherein the request is transmitted by the web application that is launched on a web browser of the secondary computing device in response to the secondary computing device scanning the encoded image displayed by the virtual desktop client;

configuring the virtual desktop to produce the GUI of the virtual desktop session on a first monitor corresponding to the primary computing device and on a second monitor corresponding to the secondary computing device; and streaming pixel data of the second monitor of the GUI of the virtual desktop session to the secondary computing device over a web connection established between the web browser of the secondary computing device and the web server operating on the primary computing device.

16. The non-transitory computer readable storage medium of claim 15, wherein pixel data of the first monitor of the GUI of the virtual desktop session is displayed on a display screen of the primary computing device by the virtual desktop client.

17. The non-transitory computer readable storage medium of claim 15, wherein the pixel data of the second monitor of the GUI of the virtual desktop session is displayed on a display screen of the secondary computing device by the web application executing in the web browser of the secondary computing device.

18. The non-transitory computer readable storage medium of claim 15, further comprising instructions that when executed by the one or more processors cause the one or more processors to execute the operations of:

receiving input data captured on the secondary computing device from the web browser of the secondary computing device, the input data including at least one of touch input, keyboard, or mouse events; and transmitting the input data by the virtual desktop client to the virtual desktop hosted on the remote server.

19. The non-transitory computer readable storage medium of claim 15, further comprising instructions that when executed by the one or more processors cause the one or more processors to execute the operations of:

receiving screen resolution information from the secondary computing device; and transmitting the screen resolution information by the virtual desktop client to the virtual desktop hosted on the remote server.

20. The non-transitory computer readable storage medium of claim 15, wherein the GUI of the virtual desktop is extended across the first monitor and the second monitor.

\* \* \* \* \*